(12) United States Patent
Makino et al.

(10) Patent No.: US 10,550,261 B2
(45) Date of Patent: Feb. 4, 2020

(54) ANTI-SLIPPING MATERIAL

(71) Applicants: KURARAY PLASTICS CO., LTD., Osaka-shi (JP); TOYOTA JIDOSHA KABUSHIKI KAISHA, Toyota-shi (JP)

(72) Inventors: Atsushi Makino, Fuwa-gun (JP); Nobuhiro Miwa, Fuwa-gun (JP); Haruyuki Takayama, Fuwa-gun (JP); Midori Miyashita, Toyota (JP)

(73) Assignees: KURARAY PLASTICS CO., LTD., Osaka-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/322,038

(22) PCT Filed: Jun. 11, 2015

(86) PCT No.: PCT/JP2015/066857
§ 371 (c)(1),
(2) Date: Dec. 23, 2016

(87) PCT Pub. No.: WO2015/198883
PCT Pub. Date: Dec. 30, 2015

(65) Prior Publication Data
US 2017/0145205 A1 May 25, 2017

(30) Foreign Application Priority Data
Jun. 27, 2014 (JP) .................................. 2014-132981

(51) Int. Cl.
*C08L 53/02* (2006.01)
(52) U.S. Cl.
CPC .................................... *C08L 53/02* (2013.01)
(58) Field of Classification Search
CPC ...................................................... C08L 53/02
See application file for complete search history.

(56) References Cited

U.S. PATENT DOCUMENTS

| | | | | |
|---|---|---|---|---|
| 6,399,696 | B1 * | 6/2002 | Toyosawa | C08K 5/01 524/474 |
| 2003/0100659 | A1 * | 5/2003 | Tasaka | C08L 23/04 524/487 |
| 2009/0105396 | A1 | 4/2009 | Fujihara et al. | |
| 2013/0137826 | A1 | 5/2013 | Urakawa et al. | |

FOREIGN PATENT DOCUMENTS

| | | |
|---|---|---|
| DE | 102 21 286 A1 | 12/2003 |
| EP | 1 031 608 A2 | 8/2000 |
| EP | 1 031 608 A3 | 8/2000 |
| JP | 10-053689 A | 2/1998 |
| JP | 2002-347178 A | 12/2002 |
| JP | 2004-238570 A | 8/2004 |
| JP | 2008-231277 A | 10/2008 |
| JP | 2008-291100 A | 12/2008 |
| JP | 2008-543978 A | 12/2008 |
| JP | 4192007 B2 | 12/2008 |
| JP | 2011-079924 A | 4/2011 |
| JP | 2011-148872 A | 8/2011 |
| JP | 2011-225890 A | 11/2011 |
| JP | 2013-147593 A | 8/2013 |
| WO | WO 2006/102154 A2 | 9/2006 |
| WO | WO 2007/023932 A1 | 3/2007 |
| WO | WO 2013/002136 A1 | 1/2013 |

OTHER PUBLICATIONS

International Search Report dated Sep. 8, 2015, in PCT/JP2015/066857 filed Jun. 11, 2015.
International Preliminary Report on Patentability and Written Opinion of the International Searching Authority dated Jan. 5, 2017 in PCT/JP2015/066857 filed Jun. 11, 2015 (submitting English translation).
Extended European Search Report dated Jan. 29, 2018 in European Patent Application No. 15811283.9, citing documents AO and AP therein, 5 pages.

* cited by examiner

*Primary Examiner* — Vickey Nerangis
(74) *Attorney, Agent, or Firm* — Oblon, McClelland, Maier & Neustadt, L.L.P.

(57) ABSTRACT

An anti-slipping material consisting of a thermoplastic elastomer composition, wherein the composition comprises (a) 100 parts by weight of a thermoplastic elastomer composed of a hydrogenated block copolymer obtained by hydrogenating a block copolymer having polymer block (A) consisting of a vinyl aromatic compound in molecule, and having a polymer block (B) consisting of a conjugated diene compound in molecule, (b) 150 to 200 parts by weight of a softener, and (c) 25 to 50 parts by weight of a propylene-based resin having a molecular weight distribution Mw/Mn, which is weight-average molecular weight/number-average molecular weight, of 3.0 or lower.

6 Claims, No Drawings

ANTI-SLIPPING MATERIAL

TECHNICAL FIELD

The present invention relates to an anti-slipping material consisting of a thermoplastic elastomer composition. In detail, the present invention relates to an anti-slipping material consisting of a thermoplastic elastomer composition, which has high mechanical strength and anti-slipping property as an anti-slipping material, and simultaneously which has high oil-resistance and easy-cleaning property as well as has a reduced amount of oil-bleed.

BACKGROUND ART

A thermoplastic elastomer has been conventionally used for an anti-slipping material applied in automobile interior parts, industrial machine parts, architectural materials, grips and the like (see Patent Literatures 1 to 4). It is easy to recycle the thermoplastic elastomer, because it is not cross-linked. In addition, the thermoplastic elastomer does not emit poisonous gas when ignited for disposal. Therefore, the thermoplastic elastomer is advantageous in view of energy saving, resource saving and environmental protection.

CITATION LIST

Patent Literature

Patent Literature 1: JP 2008-543978 A
Patent Literature 2: JP 2011-79924 A
Patent Literature 3: JP H10-53689 A
Patent Literature 4: JP 4192007 B

SUMMARY OF INVENTION

Problems to be Solved by the Invention

However, when a softener is added to the thermoplastic elastomer for providing flexibility, bleeding of the softener component (oil-bleed) sometimes becomes a problem. In addition, oil-resistance is necessary when this thermoplastic elastomer is used for automobile interior parts. Depending on kind of the automobile interior parts, it is also necessary that liquid or the like, which attaches to the parts, can be easily cleaned up (easy-cleaning property).

An object of the present invention is to provide an anti-slipping material consisting of a thermoplastic elastomer composition, which has high mechanical strength and anti-slipping property as an anti-slipping material, and simultaneously which has high oil-resistance and easy-cleaning property as well as has a reduced amount of oil-bleed.

Means for Solving the Problem

The inventors found that the above-mentioned object can be achieved by an anti-slipping material consisting of a thermoplastic elastomer composition comprising (a) a thermoplastic elastomer, (b) a softener, and (c) a propylene-based resin, and completed the present invention.

That is, the present invention provides the following preferable embodiments.

[1] An anti-slipping material consisting of a thermoplastic elastomer composition, wherein the composition comprises
(a) 100 parts by weight of a thermoplastic elastomer composed of a hydrogenated block copolymer obtained by hydrogenating a block copolymer having polymer block (A) consisting of a vinyl aromatic compound in molecule, and having a polymer block (B) consisting of a conjugated diene compound in molecule,
(b) 150 to 200 parts by weight of a softener, and
(c) 25 to 50 parts by weight of a propylene-based resin having a molecular weight distribution Mw/Mn, which is weight-average molecular weight/number-average molecular weight, of 3.0 or lower.

[2] The anti-slipping material according to the above [1], wherein the softener (b) has a weight-average molecular weight Mw of 700 to 1500.

[3] The anti-slipping material according to the above [1] or [2], wherein the softener is a paraffin-based oil.

[4] The anti-slipping material according to any one of the above [1] to [3], wherein the propylene-based resin (c) is a propylene/ethylene random copolymer.

Effects of the Invention

The anti-slipping material of the present invention can achieve high durability and grippy property as an anti-slipping material, since it has high mechanical strength and anti-slipping property. Simultaneously, the anti-slipping material of the present invention has high oil-resistance and easy-cleaning property when liquid or the like attaches thereto. Furthermore, the anti-slipping material has a reduced amount of oil-bleed, and stickiness can be suppressed.

DESCRIPTION OF EMBODIMENTS

Hereinafter, the present invention will be explained.

The anti-slipping material of the present invention consists of a thermoplastic elastomer composition comprising (a) a thermoplastic elastomer, (b) a softener, and (c) a propylene-based resin.

The thermoplastic elastomer (a) is composed of a hydrogenated block copolymer obtained by hydrogenating a block copolymer having polymer block (A) consisting of a vinyl aromatic compound in molecule, and having a polymer block (B) consisting of a conjugated diene compound in molecule.

Examples of the vinyl aromatic compound constituting the polymer block (A) include styrene, α-methylstyrene, β-methylstyrene, o-methylstyrene, m-methylstyrene, p-methylstyrene, t-butylstyrene, 2,4-dimethylstyrene, 2,4,6-trimethylstyrene, monofluorostyrene, difluorostyrene, monochlorostyrene, dichlorostyrene, methoxystyrene, vinylnaphthalene, vinylanthracene and the like. The vinyl aromatic compound may be used alone or in combination of two or more. Among them, it is preferable that the polymer block (A) is composed of a structural unit based on styrene.

The polymer block (A) may comprise a small amount of a structural unit based on the other copolymerizable monomer together with the structural unit based on the vinyl aromatic compound. In this case, ratio of the structural unit based on the other copolymerizable monomer is preferably 10% by weight or lower, and more preferably 5% by weight or lower, relative to the weight of the polymer block (A).

Examples of the other copolymerizable monomer include ionically polymerizable monomers such as 1-butene, pentene, hexene, butadiene, isoprene, methyl vinyl ether and the like. These other copolymerizable monomers may be used alone or in combination of two or more. When the polymer block (A) comprises a structural unit based on the other copolymerizable monomer except the structural unit based on the vinyl aromatic compound, their bonding configuration may be random, tapered, or the like.

Examples of the conjugated diene compound constituting the polymer block (B) include 1,3-butadiene, isoprene, 2,3-dimethyl-1,3-butadiene, 1,3-pentadiene, 1,3-hexadiene and the like. Among them, 1,3-butadiene, isoprene and a mixture of these are preferable. The conjugated diene compound may be used alone or in combination of two or more. Microstructure of the conjugated diene block in the thermoplastic elastomer (a) is not particularly limited. For example, when the polymer block (B) is a block consisting of polybutadiene, its 1,4-bonding amount is desirably from 40% to 80%. When the polymer block (B) is a block consisting of polyisoprene, its 1,4-bonding amount is desirably 70% or higher.

The polymer block (B) may comprise a small amount of a structural unit based on the other copolymerizable monomer together with the structural unit based on the conjugated diene compound. In this case, ratio of the structural unit based on the other copolymerizable monomer is preferably 30% by weight or lower, and more preferably 10% by weight or lower, relative to the weight of the polymer block (B).

Examples of the other copolymerizable monomer include an anionically polymerizable monomer such as a vinyl aromatic compound, for example, styrene, α-methylstyrene, o-methylstyrene, m-methylstyrene, p-methylstyrene, 1,3-dimethylstyrene, diphenylethylene, 1-vinylnaphthalene, 4-propylstyrene, 4-cyclohexylstyrene, 4-dodecylstyrene, 2-ethyl-4-benzylstyrene, 4-(phenylbutyl)styrene and the like. These other copolymerizable monomer may be used alone or in combination of two or more. When the polymer block (B) comprises a structural unit based on the other copolymerizable monomer such as the vinyl aromatic compound except the structural unit based on the conjugated diene compound, their bonding configuration may be random, tapered, or the like.

70% or higher of diene parts in the conjugated diene compound is usually hydrogenated, and 90% or higher of diene part in the conjugated diene compound is preferably hydrogenated. The hydrogenation ratio is preferably 70% or higher in view of high mechanic strength and weather resistance. Thus, a hydrogenated block copolymer which is preferably used in the present invention may be a styrene/ethylene-propylene/styrene-type triblock copolymer, a styrene/ethylene-butylene/styrene-type triblock copolymer, a styrene/ethylene-ethylene-propylene/styrene-type triblock copolymer and the like, each of whose hydrogenation ratio is 90% or higher. Among them, preferable are a styrene/ethylene-butylene/styrene-type triblock copolymer and a styrene/ethylene-ethylene-propylene/styrene-type triblock copolymer, each of whose hydrogenation ratio is 90% or higher.

The hydrogenation ratio of the diene parts in the polymer block (B) can be determined by measuring a content of unsaturated double bonds in the polymer block (B) before and after hydrogenation by means of iodine value measurement, infrared spectrometer (IR), nuclear magnetic resonance method ($^1$H-NMR) or the like.

A content of the polymer block (A) in the thermoplastic elastomer (a) is preferably 5 to 70% by weight, and more preferably 15 to 50% by weight, relative to the total weight of the thermoplastic elastomer (a). When the content of the polymer block (A) is within this range, sufficient tensile strength can be provided to the thermoplastic elastomer composition.

A content of the polymer block (B) in the thermoplastic elastomer (a) is preferably 30 to 90% by weight, and more preferably 50 to 80% by weight, relative to the total weight of the thermoplastic elastomer (a). When the content of the polymer block (B) is within this range, sufficient rubber elasticity can be provided to the thermoplastic elastomer composition.

The weight-average molecular weight Mw of the thermoplastic elastomer (a) is preferably 150000 to 500000, and more preferably 200000 to 400000. When the weight-average molecular weight Mw of the thermoplastic elastomer (a) is 150000 or higher, the anti-slipping material has sufficient mechanical strength, and simultaneously its tensile strength property and compression set are good, and for example, stress deformation under high temperature condition (40 to 80° C.) tends not to arise. When the weight-average molecular weight Mw of the thermoplastic elastomer (a) is 500000 or lower, its molding processability is high.

Weight-average molecular weight Mw and number-average molecular weight Mn in the present invention can be determined by carrying out measurement with gel permeation chromatography and converting the measured values to values in terms of polystyrene.

Examples of typical commercially available products of the thermoplastic elastomer (a) include TAIPOL manufactured by TSRC Corporation, SEPTON manufactured by KURARAY Co., LTD., and the like Examples of the softener (b) include process oils such as a paraffin-based oil, a naphthene-based oil and an aroma-based oil, and liquid paraffin. Among them, in view of compatibility with the thermoplastic elastomer (a) and prevention of yellowing, a paraffin-based oil and a naphthene-based oil are preferable, and a paraffin-based oil is more preferable. These may be used alone or in combination of two or more.

The weight-average molecular weight Mw of the softener (b) is preferably 700 or higher, and more preferably 750 or higher. The weight-average molecular weight Mw of the softener (b) is preferably 1500 or lower, and more preferably 1400 or lower. When the weight-average molecular weight Mw of the softener (b) is 700 or higher, oil-bleed in the anti-slipping material is considerably reduced, and the anti-slipping material has good fogging property. When the weight-average molecular weight Mw of the softener (b) is 1500 or lower, its molding processability is high.

The method for manufacturing the softener (b) is not particularly limited. For example, the softener (b) can be manufactured by a conventionally well-known method. Examples of typical commercially available products of the softener (b) include DIANA PROCESS OIL PW series (paraffin-based oils) manufactured by Idemitsu Kosan Co., LTD, DIANA PROCESS OIL NR series (naphthene-based oils) manufactured by Idemitsu Kosan Co., LTD, and NOBEL PROCESS OIL AB series (aroma-based oils) manufactured by NIKKO OIL PRODUCTS, INC.

A content of the content (b) is 150 to 200 parts by weight, and preferably 170 to 190 parts by weight, relative to 100 parts by weight of the component (a). When the content of the component (b) is 150 parts by weight or higher, the anti-slipping material has good flexibility and anti-slipping property. When the content of the component (b) is 200 parts by weight or lower, the anti-slipping material has good mechanical strength and abrasion resistance.

Examples of the propylene-based resin (c) include polypropylene, and copolymers composed of propylene. As the propylene-based resin (c), one or more selected from homotype polypropylene and block-type and random-type copolymers of propylene and a small amount of other α-olefin are used. Among them, the propylene-based resin (c) in the present invention is preferably a random-type copolymer of propylene and a small amount of other α-olefin, in view of oil-resistance and low volatility.

The propylene-based resin (c) usually comprises 100 to 90% by weight, and preferably 99 to 92% by weight, of a structural unit based on propylene, relative to the total weight of the propylene-based resin (c). The propylene-based resin (c) usually comprises 0 to 10% by weight, and preferably 1 to 8% by weight, of a structural unit based on α-olefin, relative to the total weight of the propylene-based resin (c).

Examples of α-olefin include ethylene, and α-olefin having a carbon number of 4 to 20, and specific examples thereof include ethylene, 1-butene, 1-pentene, 1-hexene, 1-octene, 4-methyl-1-pentene and the like. The α-olefin may be used alone or in combination of two or more. When the content of the structural unit based on α-olefin is within the above-mentioned range, its good stiffness can be retained. In view of good mechanical property, ethylene is preferably used as α-olefin. Preferable is a propylene/ethylene random copolymer whose ethylene content is preferably 1 to 5% by weight, and more preferably 2 to 4% by weight.

The structural unit based on propylene and the structural unit based on α-olefin in the propylene-based resin (c) can be determined by measurement with nuclear magnetic resonance method ($^{13}$C-NMR).

Melt flow rate (MFR) of the propylene-based resin (c) is usually 3 to 40 g/10 minutes, preferably 4 to 38 g/10 minutes, and more preferably 5 to 35 g/10 minutes. Use of a resin whose MFR is not within the range causes a problem of moldability.

MFR can be measured in accordance with JIS K7210 (230° C., 2.16 kg load).

A molecular weight distribution Mw/Mn (weight-average molecular weight/number-average molecular weight) of the propylene-based resin (c) is 3.0 or lower, preferably 2.9 or lower and more preferably 2.85 or lower, and is usually or higher and preferably 1.01 or higher. When the molecular weight distribution Mw/Mn is 3.0 or lower, an amount of a low-molecule weight component causing volatilization is reduced. The molecular weight distribution Mw/Mn can be controlled by adjusting polymerization condition (polymerization temperature, polymerization pressure and the like), using a metallocene catalyst used as a catalyst, and/or changing a kind of the metallocene catalyst.

The method for producing the propylene-based resin (c) is not particularly limited. For example, the propylene-based resin (c) can be manufactured by a conventionally well-known method. Examples of typical commercially available products of the propylene-based resin (c) include WINTEC series manufactured by Japan Polypropylene Corporation.

A content of the content (c) is 25 to 50 parts by weight, and preferably 30 to 45 parts by weight, relative to 100 parts by weight of the component (a). When the content of the component (c) is 25 parts by weight or higher, the anti-slipping material has good moldability and easy-cleaning property. When the content of the component (c) is 50 parts by weight or lower, the anti-slipping material has good anti-slipping property.

Optionally, the anti-slipping material of the present invention may further comprise an additive (d) in addition to the above-mentioned components (a), (b) and (c).

Examples of the additive (d) include an antioxidant, a thermal stabilizer, a light stabilizer, an ultraviolet absorber, an inorganic filler, a nucleating agent, a foaming agent, a colorant, an anti-blocking agent, a slipping agent, an antistatic agent and the like.

Examples of the antioxidant include phenol-based antioxidants such as 2.6-di-tert-butyl-p-cresol, 2,6-di-tert-butylphenol, 2,4-dimethyl-6-tert-butylphenol, 4,4'-dihydroxydiphenyl, tris(2-methyl-4-hydroxy-5-tert-butylphenyl)butane, tetrakis[methylene-3-(3,5-di-tert-butyl-4-hydroxyphenyl)propionate]methane, and 3,9-bis{2-[3-(3-tert-butyl-4-hydroxy-5-methylphenyl)propionyloxy]-1,1-dimethylethyl}-2,4,8,10-tetraoxaspiro-5,5-undecane; phosphite-based antioxidants; and thioether-based antioxidants. Among them, phenol-based antioxidants and phosphite-based antioxidants are preferable.

A content of the antioxidant is preferably 0.01 to 1 part by weight, and more preferably 0.1 to 0.5 parts by weight, relative to 100 parts by weight of the component (a).

It is possible to add resin such as polyethylene and styrene-based resin to the anti-slipping material, depending on its use application. It is possible to add an inorganic filler such as calcium carbonate, talc, carbon black, oxidized titanium, silica, clay, barium sulfate and magnesium carbonate, in view of improvement of weather resistance and/or weight increase. It is also possible to add an inorganic or organic fibrous material such as glass fiber and carbon fiber.

Optionally, the thermoplastic elastomer composition, which is used in present invention, may be crosslinked in the presence of peroxide and crosslinking aid. Examples of the peroxide include dicumyl peroxide, di-tert-butyl peroxide, 2,5-dimethyl-2,5-di(tert-butylperoxy)hexane, 2,5-dimethyl-2,5-di(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butylperoxybenzoate, tert-butylperoxyisopropyl carbonate, diacetyl peroxide, lauroyl peroxide, tert-butyl cumyl peroxide, hydrogen peroxide, and the like. Examples of the crosslinking aid include poly-functional methacrylate monomers such as divinylbenzene, triallylcyanurate, ethylene glycol dimethacrylate, diethylene glycol dimethacrylate, triethylene glycol dimethacrylate, polyethylene glycol dimethacrylate, trimethylolpropane trimethacrylate, and ally methacrylate; poly-functional vinyl monomers such as vinyl butyrate and vinyl stearate.

Durometer A hardness of the thermoplastic elastomer composition in the present invention is preferably adjusted to 10 to 80, more preferably 10 to 50, and further more preferably 20 to 50, in view of easy-cleaning property and anti-slipping property. A method for measuring durometer A hardness will be described below.

As a method for producing the thermoplastic elastomer composition in the present invention, a conventional method for producing a resin composition or a rubber composition may be used. The thermoplastic elastomer composition may be produced by uniformly combining the components by means of a melt-mixing machine such as a single screw extruder, a twin screw extruder, Bumbary mixer, a heat roll, and various kneaders. Setting temperature of the machine may be arbitrarily selected within 150° C. to 300° C., and the production process is not limited.

The anti-slipping material of the present invention may be obtained by molding the thermoplastic elastomer composition by means of a conventionally known method such as heat press, injection molding, extrusion molding and calender molding. It is also possible to use a molding method with two steps in which a detailed part of a sheet or film molded by extrusion molding or calender molding is processed by press molding. It is also possible to integrally mold the thermoplastic elastomer composition in the present invention and a rigid resin such as propylene resin by means of composite injection molding with two kinds of materials, such as two-color molding insert molding, or multilayer injection molding. A shape of the anti-slipping material thus obtained may be arbitrarily selected, and examples thereof include circle-shape, polygonal shape, and the like.

Component (d)
Phenol-based antioxidant, ADEKASTAB AO-80 manufactured by ADEKA Corporation

TABLE 1

| Formulation | Example | | | | Comparative Example | | | | | |
|---|---|---|---|---|---|---|---|---|---|---|
| | 1 | 2 | 3 | 4 | 1 | 2 | 3 | 4 | 5 | 6 |
| Component (a-1) | 100 | | 100 | 100 | 100 | 100 | 100 | 100 | 100 | |
| Component (a-2) | | 100 | | | | | | | | |
| Component (b-1) | 190 | 190 | | | 190 | 190 | 190 | 200 | 190 | |
| Component (b-2) | | | 190 | | | | | | | |
| Component (b-3) | | | | 190 | | | | | | |
| Component (c-1) | | | | | 25 | 30 | | | | |
| Component (c-2) | 30 | 30 | 30 | 30 | | | | 20 | | 100 |
| Component (c-3) | | | | | | | 25 | | | |
| Component (c-4) | | | | | | | | | 30 | |
| Component (d) | 0.1 | 0.1 | 0.1 | 0.1 | 0.1 | 0.1 | 0.1 | 0.1 | 0.1 | |

EXAMPLE

Hereinafter, the present invention will be described in detail by way of example, but the present invention is not limited to the examples.

Each of thermoplastic elastomer compositions in form of pellet was obtained by mixing and melt-mixing the components in accordance with formulation described in Table 1 at 200° C. by means of a twin screw extruder (bore: 46 mm, L/D=46). An injection-molded sheet was produced with each of these thermoplastic elastomers in an injection molding machine (processing temperature: 200° C.).

In Examples 1 to 4 and Comparative Examples 1 to 6 in Table 1, the following components were used as components (a), (b), (c) and (d).

Component (a)
- (a-1) TAIPOL 6151 manufactured by TSRC Corporation, Mw: 260000
- (a-2) SEPTON 4055 manufactured by KURARAY Co., LTD., Mw: 280000

Component (b)
- (b-1) DIANA PROCESS OIL PW-380 manufactured by Idemitsu Kosan Co., LTD, a paraffin-based oil, Mw: 1300
- (b-2) DIANA PROCESS OIL PW-90 manufactured by Idemitsu Kosan Co., LTD, a paraffin-based oil, Mw: 790
- (b-3) DIANA PROCESS OIL PW-32 manufactured by Idemitsu Kosan Co., LTD, a paraffin-based oil, Mw: 510

Component (c)
- (c-1) BC-1 manufactured by Japan Polypropylene Corporation, MFR (230° C., 2.16 kg load): 30, Mw/Mn: 15.7
- (c-2) WINTEC WFX4T manufactured by Japan Polypropylene Corporation, MFR (230° C., 2.16 kg load): 7.0, Mw/Mn: 2.8
- (c-3) F327 manufactured by Prime Polymer Co., Ltd., MFR (230° C., 2.16 kg load): 30, Mw/Mn: 4.6
- (c-4) NOVATEC LDPE LJ8041 manufactured by Japan Polypropylene Corporation, MFR (230° C., 2.16 kg load): 23, density: 0.918 g/cm$^3$, Mw/Mn: 8.4

The following tests for each of the anti-slipping materials as produced above were carried out. The results are described in Table 2.

[Test Method]

1. Hardness

Each of Durometer A hardness (spring type) values, which was according to the process of JIS K6253, of the injection-molded sheets (thickness: 6 mm) produced in accordance with the formulation described in Table 1 in the injection molding machine was measured. A value measured three seconds after a hardness meter was placed in contact with a test sample was employed.

2. Breaking Strength and Breaking Elongation

Each of breaking strength and breaking elongation values of the injection-molded sheets produced in accordance with the formulation described in Table 1 in the injection molding machine was measured. The measurement was carried out in accordance with JIS K6251. From each of the injection-molded sheets produced in the above-mentioned injection molding machine, a sample in form of dumbbell shape No. 3 (TD direction) was stamped out as a test sample. Tensile strength test (tension speed: 500 mm/min) for each of these test samples was carried out in accordance with JIS K7311 in a tensile strength tester (Autograph AG-500NI, manufactured by SHIMADZU Corporation) to measure an elongation value when the sample was broken, and a strength when the sample was broken as a breaking strength value.

3. Coefficient of Static Friction

Each of coefficients of static friction of the injection-molded sheets produced in accordance with the formulation described in Table 1 in the injection molding machine was measured. The measurement was carried out in accordance with JIS K7125. When value of the coefficient of static friction is three or higher, anti-slipping property is good.

4. Oil-resistance

A test of oil-resistance for each of the injection-molded sheets produced in accordance with the formulation described in Table 1 in the injection molding machine was carried out. From each of the injection-molded sheets produced in the injection molding machine, a circular sheet having a diameter of 120 mm and a thickness of 2 mm was stamped out as a test sample. A cylindrical tube having an inner diameter of 41 mm was placed on each of these test samples, and a weight of 150 g was further put on the tube. 1.5 g of liquid paraffin (manufactured by NACALAI TESQUE, INC., product code: 26132-35, specific weight: 0.82 to 0.845) was dropped onto the test sample surrounded by the tube, and heated at 80° C. for 24 hours. After heating, dimension change ratio of thickness of the test samples before and after the test was measured.

When dimension change ratio of thickness of the test samples before and after the test is 24.0% or lower, oil-resistance is good.

5. Oil-bleed

A test of oil-bleed for each of the injection-molded sheets produced in accordance with the formulation described in Table 1 in the injection molding machine was carried out. From each of the injection-molded sheets produced in the injection molding machine, a rectangular sheet having a size of 50 mm×100 mm and a thickness of 2 mm was stamped out as a test sample. Each of these test samples was put between papers (Shin-Sun-Ace R100 manufactured by KAYO SHIGYO Corporation, 70 mm×120 mm), and heated in a thermostatic oven (Gear oven manufactured by TABAI ESPEC, GPH-200), whose temperature was set at 100° C., for one week. The condition of bleeding of oil into the papers was observed after heating.

As to assessment of oil-bleed, "A" means that no bleeding of oil was observed or that a little bleeding of oil was observed, "B" means that slightly remarkable bleeding of oil was observed, and "C" means that considerably remarkable bleeding of oil was observed.

6. Easy-cleaning Property

An evaluation test of easy-cleaning property for each of the injection-molded sheets produced in accordance with the formulation described in Table 1 in the injection molding machine was carried out. From each of the injection-molded sheets produced in the injection molding machine, a rectangular sheet having a size of 50 mm×100 mm and a thickness of 2 mm was stamped out as a test sample. 2 g of silica sand No. 5 manufactured by Ishihara Corporation was attached onto the surface of the test sample. The sand was swept with a bamboo brush SK11 (bent handle, nylon bristles No. 17, manufactured by Fujiwara Sangyo Co., Ltd.), and the number of times to sweep all of the sand was measured.

When the number of times to sweep all of the sand with a brush is 15 times or less, easy-cleaning property is good.

7. Fogging Property

When a thermoplastic elastomer is used for automobile interior parts, fogging phenomenon may occur that a softener component volatilizes as a result of a long period of use to generate a fogged window glass. In order to assess resistance against this fogging phenomenon, a test of fogging property for each of the injection-molded sheets produced in accordance with the formulation described in Table 1 in the injection molding machine was carried out. The test was carried out in accordance with ISO 6452, DIN 75201. From each of the injection-molded sheets produced in the above-mentioned injection molding machine, a circular sheet having a diameter of 80 mm and a thickness of 2 mm was stamped out as a test sample. Each of these test samples was put in a tall beaker placed in an oil bath whose temperature was set at 80° C., and a volatile component was made attached onto a glass plate, whose temperature was set at 20° C., for three hours. Using a light permeability of a glass plate when no test sample was put in the beaker as a standard, light permeability ratio of a light permeability when the volatile component was attached was measured. The light permeability measurement was carried out with True GLOSS GM-26PRO manufactured by Murakami Color Research Laboratory. The optical condition was in accordance with ISO 2813, ASTM D523 and JIS 28741. The measurement angle was 60°, measurement area was 14 mm×22 mm, and measurement aperture was 26 mm×40 mm.

TABLE 2

|  | Example | | | | Comparative Example | | | | | |
| --- | --- | --- | --- | --- | --- | --- | --- | --- | --- | --- |
|  | 1 | 2 | 3 | 4 | 1 | 2 | 3 | 4 | 5 | 6 |
| Hardness (Durometer A Hardness) | 34 | 34 | 28 | 33 | 30 | 34 | 31 | 15 | 23 | 98 |
| Breaking Strength (MPa) | 11.0 | 11.8 | 9.66 | 8.55 | 6.31 | 6.69 | 9.00 | 7.85 | 3.51 | 23.7 |
| Breaking Elongation (%) | 980 | 970 | 1060 | 1040 | 930 | 960 | 990 | 1070 | 910 | 800 |
| MFR (230° C., 2.16 kg load) | 11.3 | 9.70 | 2.84 | 4.00 | 1.71 | 3.18 | 3.62 | 0.25 | 2.19 | 7.02 |
| Coefficient of Static Friction | 5.6 | 6.0 | 14.4 | 8.5 | 11.2 | 9.8 | 5.7 | 15.9 | 6.5 | 0.8 |
| Oil-resistance (Dimension Change Ratio, %) | 18.5 | 19.8 | 22.9 | 21.1 | 25.1 | 25.7 | 24.2 | 21.6 | 26.0 | 6.9 |
| Oil-bleed | A | A | A | A | A | A | B | B | C | B |
| Easy-cleaning Property (Times) | 12 | 12 | 12 | 12 | 18 | 15 | 12 | 2100 | 50 | 3 |
| Fogging Property (%) | 100 | 100 | 94.4 | 30.2 | 100 | 100 | 100 | 99.7 | 99.8 | 99.9 |

As a result, the anti-slipping materials consisting of the thermoplastic elastomer compositions in Examples 1 to 4 according to the present invention have high breaking strength, and thus have high mechanical strength. The anti-slipping materials in Examples 1 to 4 according to the present invention had high coefficient of static friction, and thus had sufficient anti-slipping property. The anti-slipping materials in Examples 1 to 4 according to the present invention achieved good results in the tests of oil-resistance, oil-bleed and easy-cleaning property. In addition, when the weight-average molecular weight Mw of the softener (b) was within the defined range, good result was obtained in the test for fogging property. On the other hand, the anti-slipping material in Comparative Examples 1 to 5 did not comprise the defined parts of weight of the propylene-based resin (c) defined according to the present invention, and thus did not achieve good results in the above-mentioned tests. Comparative Example 6 where the anti-slipping material consisted only of propylene resin did not have any good results in the above-mentioned tests, and thus the object of the present invention was not achieved.

The invention claimed is:

1. An anti-slipping material comprising a thermoplastic elastomer composition, wherein the composition comprises:
   (a) 100 parts by weight of a thermoplastic elastomer comprising a hydrogenated block copolymer obtained by hydrogenating a block copolymer having:
      a polymer block (A) consisting of a structural unit based on a vinyl aromatic compound and optionally, a structural unit based on another copolymerizable monomer in the block copolymer, wherein a % by weight content of the structural unit based on the optional copolymerizable monomer is 10% by weight or lower relative to the weight of the polymer block (A); and
      having a polymer block (B) consisting of a structural unit based on a conjugated diene and optionally a structural unit based on another copolymerizable monomer in the polymer block B, wherein a weight % content of the structural unit based on the optional copolymerizable monomer is 30% or lower relative to the weight of the polymer block (B);
   (b) 150 to 190 parts by weight of a paraffin-based oil; and
   (c) 25 to 50 parts by weight of a propylene ethylene random copolymer having 1 to 5 weight % ethylene and having a molecular weight distribution Mw/Mn, which is weight-average molecular weight/number-average molecular weight, of 3.0 or lower.

2. The anti-slipping material according to claim 1, wherein the paraffin-based oil (b) has a weight-average molecular weight Mw of 700 to 1500.

3. The anti-slipping material according to claim 1, wherein a weight-average molecular weight Mw of the thermoplastic elastomer (a) is from 150000 to 500000.

4. The anti-slipping material according to claim 1, wherein a melt flow rate (MFR) of the propylene-ethylene random copolymer (c) is from 3 to 40 g/10 minutes.

5. The anti-slipping material according to claim 1, further comprising at least one additive selected from the group consisting of an antioxidant, a thermal stabilizer, a light stabilizer, an ultraviolet absorber, an inorganic filler, a nucleating agent, a foaming agent, a colorant, an anti-blocking agent, a slipping agent and an antistatic agent.

6. The anti-slipping material according to claim 1, wherein the thermoplastic elastomer composition is cross-linked.

* * * * *